United States Patent
Perez et al.

(10) Patent No.: US 10,460,100 B2
(45) Date of Patent: Oct. 29, 2019

(54) INJECTION OF DATA FLOW CONTROL OBJECTS INTO APPLICATION PROCESSES

(71) Applicant: Hewlett-Packard Development Company, L.P., Fort Collins, CO (US)

(72) Inventors: David S Perez, Bristol (GB); Helen Balinsky, Bristol (GB); Steven J Simske, Ft. Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 366 days.

(21) Appl. No.: 14/917,839

(22) PCT Filed: Sep. 23, 2013

(86) PCT No.: PCT/US2013/061131
§ 371 (c)(1),
(2) Date: Mar. 9, 2016

(87) PCT Pub. No.: WO2015/041693
PCT Pub. Date: Mar. 26, 2015

(65) Prior Publication Data
US 2016/0342789 A1    Nov. 24, 2016

(51) Int. Cl.
*G06F 21/54* (2013.01)
*G06F 21/60* (2013.01)
*G06F 9/54* (2006.01)

(52) U.S. Cl.
CPC ............ *G06F 21/54* (2013.01); *G06F 9/542* (2013.01); *G06F 21/606* (2013.01); *G06F 21/608* (2013.01); *G06F 2209/542* (2013.01); *G06F 2221/034* (2013.01)

(58) Field of Classification Search
CPC ........................................................ G06F 21/54
See application file for complete search history.

(56) References Cited

U.S. PATENT DOCUMENTS

| | | | |
|---|---|---|---|
| 6,470,388 B1 * | 10/2002 | Niemi ................ | G06F 11/3476 709/223 |
| 7,908,640 B2 * | 3/2011 | Beresnevichiene ..... | G06F 21/52 380/59 |
| 2005/0034002 A1 * | 2/2005 | Flautner ................ | G06F 1/3203 713/322 |
| 2005/0091558 A1 | 4/2005 | Chess et al. | |
| 2008/0016314 A1 | 1/2008 | Li et al. | |
| 2011/0035783 A1 | 2/2011 | Terasaki et al. | |
| 2011/0239306 A1 * | 9/2011 | Avni ...................... | G06F 21/54 726/26 |
| 2012/0079594 A1 | 3/2012 | Jeong et al. | |

(Continued)

OTHER PUBLICATIONS

Black Hat Technical Security Conference: USA 2011, Aug. 2011.
(Continued)

*Primary Examiner* — Josnel Jeudy
(74) *Attorney, Agent, or Firm* — HP Inc. Patent Department

(57) ABSTRACT

A callback, which may be assigned to a creation event of an application process, may be executed. In response to the execution of the callback, a data flow control object may be injected into the application process. The data flow control object may be to intercept a system call made by the application process and to control flow of data handled by the system call.

20 Claims, 3 Drawing Sheets

(56) References Cited

U.S. PATENT DOCUMENTS

2012/0204193 A1    8/2012  Nethercutt
2013/0047255 A1    2/2013  Dalcher
2013/0219453 A1    8/2013  Balinsky

OTHER PUBLICATIONS

Lieberman, D., Preventing Intellectual Property Abuse, Mar. 11, 2009.
Nessus Compliance Checks Auditing System Configurations and Content, Tenable Network Security, Revision 67, May 8, 2013.
Uhlig, V., Scalability of Microkernel-based Systems, pp. 1-129, May 30, 2005.

\* cited by examiner

INJECTION OF DATA FLOW CONTROL OBJECTS INTO APPLICATION PROCESSES

BACKGROUND

Data leaks, such as accidental or intentional disclosures of sensitive information, are commonplace. Such sensitive information may include, for example, financial information, personal identity information, health information, intellectual property, or the like. Such data leaks may occur in scenarios such as, for example, sending confidential email to the wrong address, uploading a confidential document instead of a conference submission, saving a confidential document on a USB drive which is subsequently lost, printing a confidential document and then leaving it on an unsecured printer, or the like.

BRIEF DESCRIPTION OF THE DRAWINGS

Some examples are described with respect to the following figures.

DETAILED DESCRIPTION

Figure 1:
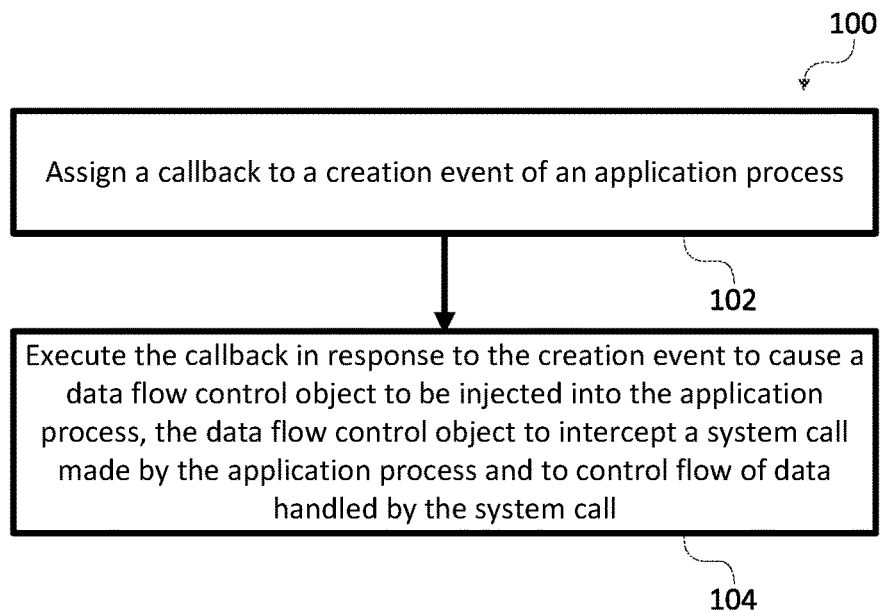
FIG. 1 is a flow diagram illustrating an example method of preventing a injecting a data flow control object into an application process according to some examples.

The present disclosure concerns data flow control systems, computing devices, computer readable storage media, and methods of injecting a data flow control object (DECO). Application programs such as e-mail clients and internee browsers often handle sensitive information and at the same time provide export functionalities. Injection of a data flow control object into an "application process", which is defined herein as an instance of an application program to be formed and executed, may, for example, provide functionality modification for such application programs where the problem of sensitive data leaks was not anticipated and addressed in the first place. Thus, direct source modification of the application programs, which may be uneconomical, illegal, or lead to unanticipated side effects due to an incomplete understanding of the entire set of source code, may not be necessary. A "system call" is a request by an application process for service from an operating system's kernel. Example system calls are requests for hard disk access, creation and execution of new application processes, and communication with integral kernel services such as scheduling. Further examples of system calls are requests for writing a file, copying a file, moving a file, and sending bytes through a socket, which may be triggered either as an individual system call or a group of them by the user actions of attempting to save a file, upload a file, send an e-mail, and print. Thus, a system call may request a flow of data out of the application process. A "data flow control object" as defined herein is code to intercept a system call by an application process to an operating system, and to control the flow of the data handled by the system call. "Data flow control", or variants thereof, is defined herein as an action taken in response to data being exported from the application as a result of a system call.

The injection of a data flow control object may be performed in response to the detection of an application process creation event using a callback assigned to the creation event at a kernel module of an operating system or at a management instrumentation of the operating system. Thus, the injection may, for example, occur with minimal delay after the creation event, for example when the application process is newly formed or prior to the application process being fully formed and/or deployed. Thus, sensitive data may not be exported out of the system unprocessed prior to the injection, because the application process may not have had a chance to make any system calls to the operating system. Additionally, the injection methods and systems herein, for example using the callback, may be operable with any type of application process. Thus, data leaks may be prevented from any type of application process. Additionally, as the detection of a given creation event may be a one-time occurrence for each new application process, a small amount of processing overhead may be needed.

FIG. 1 is a flow diagram illustrating a method 100 of injecting a data flow control object into an application process according to some examples. The method 100 may be performed by a processor and may be computer implemented. At block 102, a callback is assigned to a creation event of an application process. At block 104, a callback is executed in response to the creation event to cause a data flow control object to be injected into the application process, the data flow control object to intercept a system call made by the application process and to control flow of data handled by the system call. The data flow control object may be to intercept a system call made by the application process, and to control flow of data being handled by the system call. A "callback" is defined herein as a first executable code that is assigned, e.g. passed, to a second executable code, such that the second executable code is to execute the first executable code thereafter.

Figure 2A:
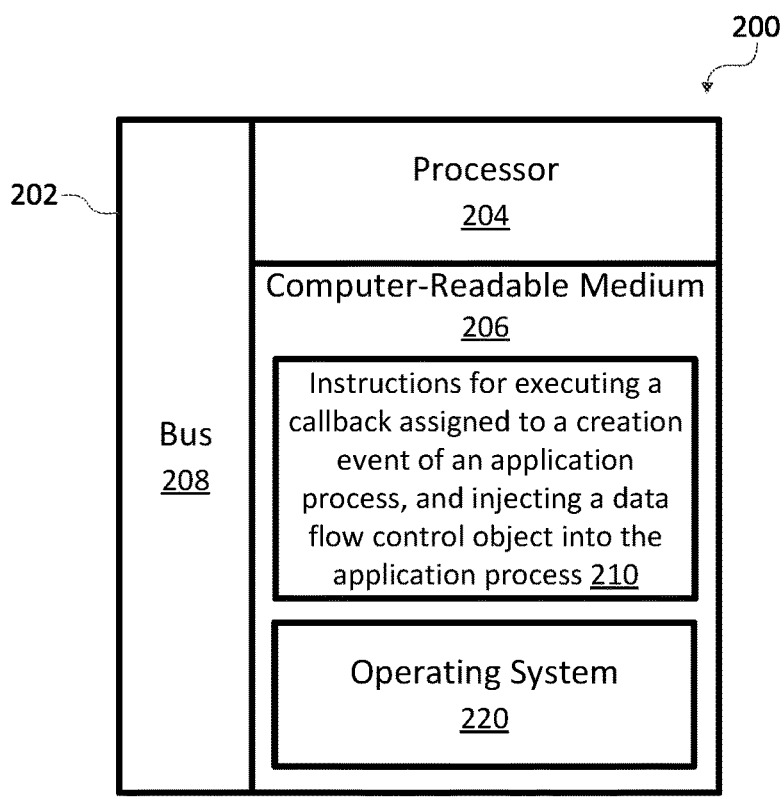
FIG. 2A is a schematic diagram of an example data flow control system according to some examples.
Figure 2B:
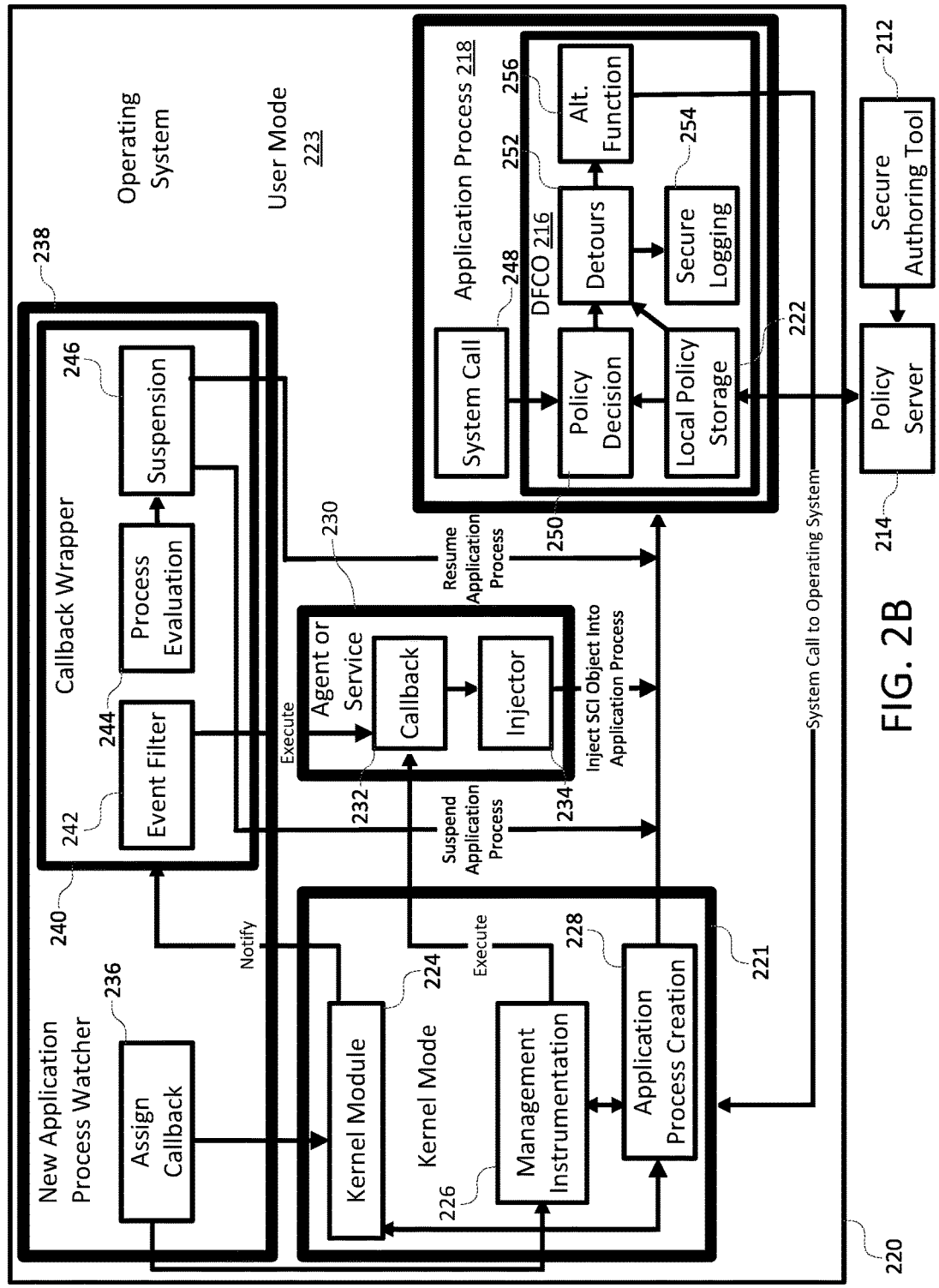
FIG. 2B is a schematic diagram of an example operating system according to some examples.
Figure 3:
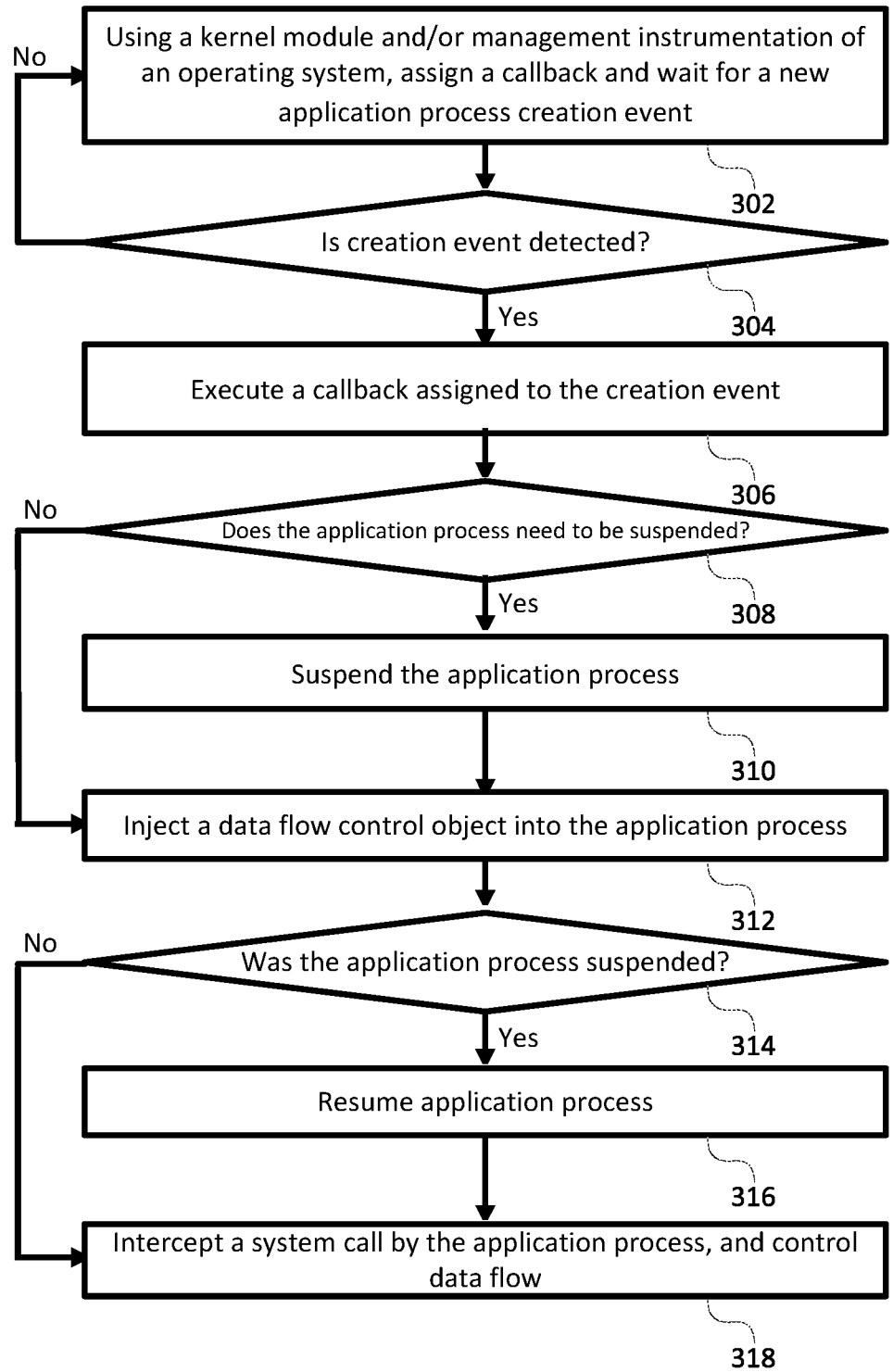
FIG. 3 is a flow diagram illustrating an example method of injecting a data flow control object into an application process according to some examples.

FIG. 3 is a flow diagram illustrating a method 300 of injecting a data flow control object into an application process according to some examples. In describing FIG. 3, reference will be made to FIG. 2A, which is a schematic diagram of a data flow control system 200 according to some examples, and FIG. 2B, which is a schematic diagram of an operating system of FIG. 2A according to some examples. In some examples, the ordering shown in FIG. 3 may be varied, such that some steps may occur simultaneously, some steps may be added, and some steps may be omitted.

Any of the operations and methods disclosed herein may be computer-implemented, for example they may be controlled by the system 200 and/or the computing device 202. For example, each of the steps of the methods disclosed herein may be performed using hardware, firmware instructions, and software instructions. The computing device 202 may be any device with processing capability, such as a server, a desktop computer, a laptop computer, computer tablet, a smart phone, a personal digital assistant, or the like. The computing device 202 may include a processor 204 and a computer-readable storage medium 206.

The processor 204 may, for example, be a microprocessor, a microcontroller, a programmable gate array, an application specific integrated circuit (ASIC), a computer processor, or the like. The processor 204 may, for example, include multiple cores on a chip, multiple cores across multiple chips, multiple cores across multiple devices, or combinations thereof. In some examples, the processor 204 may include at least one integrated circuit (IC), other control logic, other electronic circuits, or combinations thereof.

The processor 204 may be in communication with a computer-readable storage medium 206 via a communication bus 208. The computer-readable storage medium 206 may include a single medium or multiple media. For example, the computer readable medium may include one or all of a memory of the ASIC, a firmware storage medium in the computing device 202, and separate memory in the computing device 202. The computer-readable storage medium 206 may be any electronic, magnetic, optical, or other physical storage device. For example, the computer-readable storage medium 206 may be, for example, random access memory (RAM), static memory, read only memory, an electrically erasable programmable read-only memory (EEPROM), a hard drive, an optical drive, a storage drive, a CD, a DVD, and the like. The computer-readable storage medium 206 may be non-transitory. The computer-readable storage medium 206 may store, encode, or carry computer executable instructions 210 that, when executed by the processor 204, may cause the processor 204 to perform the steps of any one or more of the methods or operations disclosed herein according to various examples. For example, the instructions 210 may comprise instructions to execute a callback that is assigned to a creation event of an application process, and inject, in response to the execution, a data flow control object into the application process, where the data flow control object may be to intercept a system call made by the application process and to control flow of data being handled by the system call.

A secure authoring tool 212 may be used to generate and safeguard policies for the data flow control object to intercept system calls, and to control flow of data handled by the system calls. For example, an organization may develop a series of policies that determine, for example, which action of various users should be prevented or at least cautioned against. For example, the policies may require prevention, or caution against, the exposure of sensitive data by such actions as transmission by e-mail, storage on portable drives, and printing on unsecure printers. The policies may depend, for example, on the sensitivity of data being accessed as well as the identity of the user accessing the data. These policies may be enforced and enacted by a data flow control object 216. Thus, the policies may be instructions for the data flow control object 216 regarding which actions to monitor, and which patterns of data in documents to allow for export or block, for example. For example, the data flow control object may be passive or active or both. The data flow control object 216 may capture and analyze data being transmitted as a result of the system call. Passive data flow control may, for example, include monitoring data flow at run-time, performing audits on the data flow, generating logs of data, or other passive data management. Active data flow control may, for example, include authenticating a user prior to allowing data to be exported from the application process, blocking or preventing data leaks, diverting the data, forcing encryption, or other active data management. As will be discussed in more detail at block 318, the data flow control object 216 may include policy decision logic 250 and detour logic 252. Examples of the detour logic 252 include but are not limited to Microsoft Detour Professional software and Easyhook. Depending on the policies enforced and data to be exported the policy decision logic 250 may determine whether to replace original system calls by the injected application process 218 with alternative functionality provided by the alternative function logic 256, and whether the original system calls may or may not be executed. Then, the detour logic 252 may perform the determined actions, if any.

The policies may be stored in a secure policy server 214 and/or locally in the computing device 202. The policy server may be external to the computing device 202. The policy server 214 may be, for example, an organization-wide service implemented on a single server or a cluster of synchronized or otherwise-collaborating servers.

Enforcement of policies stored within the policy server 214 may be executed and enacted by a data flow control object 216 that may be injected into each application process 218 that may execute any of the actions that are subject to the defined policies, as will later be discussed in more detail. The application process 218 may run on the computing device 202. The data flow control object 216 may intercept system calls made by the application process 218 to an operating system 220 of the computing device 202, and may control flow of data handled by the system call. The operating system 220 may be any type of operating system that manages hardware resources of the computing device 202 and provides common services for application processes 216. The operating system 220 may include a kernel mode 221, and may include a user mode 223 which is shown in FIG. 26 as any part of the operating system 220 that is not in the kernel mode 221. Although the instructions 210 are shown in FIG. 2A as stored separately from the operating system 220, in some examples the instructions 210 may be part of the code of the operating system 200. Data flow control may be activated for any application process 218 that performs actions that may result in export of data. Examples of actions whose performance may result in a data leak are saving a file, copying a file, backing up a file for example by using a RAID system, moving a file, uploading a file, sending e-mail, printing, or the like.

The data flow control object 216 may include local policy storage 222. The local policy storage 222 may store at least a subset of or all of the policies stored in the policy server 214 that apply to the computing device 202. In some examples, the policies stored in local policy storage 222 may be automatically synchronized with policies stored in the policy server 214. For example, there may be a secure communication channel between the computing device 202 and the policy server 214. Policies from policy server 214 may be updated within the computing device 202 within a policy define interval time or default restrictive policies may be applied. When the computing device 202 appears on-line from an off-line mode, the computing device 202 may immediately communicate with the policy server 214 to receive the latest policies.

Examples in which there is no local policy storage 222 may include a local policy enforcement mechanism where the policies are not stored within the computing device 202. In these examples, data may, for example, be uploaded to the policy server 214 and evaluated for any potential breach of policies stored within the policy server 214. Then, for example, the policy server 214 may instruct the computing device 202 on how to handle any violation of a policy stored in policy server 214. In yet another example, there may be local policy storage 222, and no central policy server 214. In this example, policies may be defined by an administrator directly on the device.

At block 302, whether a creation event of an application process 218 has occurred in application process creation logic 228 may be detected using a kernel module 224 and/or management instrumentation 226. The system may wait for any creation events of application processes 218. In some examples, one of these may be used for detection of creation events, and in other examples, as will be discussed in more detail, both may be used.

A "kernel module" is defined herein to be an object file having code to extend a kernel of an operating system. Examples of kernel modules are kernel-mode drivers supported by Microsoft Windows operating systems, kernel loadable modules supported by FreeBSD operating systems, kernel extensions supported by OS X operating systems, loadable kernel modules supported by Linux operating systems, or any other kernel modules supported by any other operating systems. "Management instrumentation" is defined herein as one or more extensions to the device drivers of an operating system to provide an interface through which information may be provided such as information about a creation event of an application. Examples of management instrumentation commands are Windows Management Instrumentation (WMI) of Microsoft Windows operating systems, Windows Management Instrumentation Command-Line (WMIC), Web-Based Enterprise Management (WBEM) of Linux operating systems, or any other management instrumentation of any other operating systems.

The kernel module 224 may be used for detection in that, in response to a creation event occurring, (1) the kernel module 224 may receive a notification from the application process creation logic 228 of OS about the creation event, and (2) a callback 232 may be assigned, by assign callback logic 236, to the creation event and termination event at the kernel module 224. For example, using a creation event routine such as PsSetCreateProcessNotifyRoutine( ) of the kernel-mode driver of Microsoft Windows, the callback 232 may be added to a list of routines to be called whenever a creation event or termination event occurs. The detection may, in some examples, occur prior to the application process being fully formed and/or deployed. The term "deployed" means that the application process is fully executed and running. The kernel module 224 may operate in a kernel mode 221 of the operating system 224. In some examples, use of the kernel module 224 may improve security of the overall data control solution, because the kernel mode 221 functions may be accessible by an administrator account and may prevent less privileged users from disabling, monitoring, altering, or removing the kernel module 224 or the data control solution.

Management instrumentation 226 may be used for detection in that, in response to a creation event occurring, (1) the management instrumentation 226 may receive a notification from the application process creation logic 228 about the creation event, and (2) the callback 232 may be assigned, by assign callback logic 236, to the creation event at the management instrumentation 226 using a management instrumentation command. A "management instrumentation command" is defined herein to be a command entered into a command line of the management instrumentation 226 to obtain information such as the information about the creation event. An example management instrumentation command is a Windows Management Instrumentation command "SELECT*FROM Win32_ProcessStartTrace" using the ManagementEventWatcher C++/C# class defined in System.Management (System.Management.dll) of the Windows Management Instrumentation. This command may provide information about a creation event of an application, for example after the application process is fully formed and/or deployed by the application process creation logic 228 and the application process is executed.

At decision block 304, if a creation event is detected, the method may proceed to block 306, and if a creation event is not detected, the method may return to block 302.

As discussed earlier, in some examples, both the kernel module 224 and management instrumentation 226 are used for detection. For example, the kernel module 224 and the management instrumentation 226 may simultaneously be used for detection. In other examples, the kernel module 224 may be used for detecting some types of application processes, and the management instrumentation 226 may be used for detecting other types of application processes. In these examples, the kernel module 224 may be used for application processes running at or above a threshold speed, e.g. application processes that are expected to take at or below a threshold time before attempting a system call. The kernel module 224 may be suitable for fast application processes, because the detection using the kernel module 224 may occur prior to the application process being fully formed and deployed, and because of the ability to suspend the application process while injection is performed, as will be discussed. Thus, the management instrumentation 226 may be used for application processes running below the threshold speed, e.g. application processes that are expected to take above the threshold time before attempting a system call, because the detection using the management instrumentation 226 may, in some examples, occur after the application process is fully formed. However, in some examples, even when using management instrumentation 226, application processes may be suspended during injection.

A new application process watcher 238 may be used in examples implementing the kernel module 224. In some examples, the new application process watcher 238 may include the assign callback logic 236 and a callback wrapper 240. The new application process watcher 238 may, in some examples, be in the form of a dynamic-link library (DLL). The callback wrapper may include event filter logic 242, process evaluation logic 244, and suspension logic 246. Unlike the kernel module 224, which may be implemented in the kernel mode 221 of the operating system 220, the features of the new application process watcher 238 may be implemented in the user mode 223 of the operating system 220. The user mode 223 may implement safety protections not available in the kernel mode 221. Thus, relative to logic in the user mode 223, logic in the kernel mode 221 may be more likely to cause a crash of the operating system 220, resulting in, for example, a BlueScreen of Death (BSoD). Thus, risk of crash may be minimized by implementing the new application process watcher 238 as a middleware layer between the kernel module 224 and the agent or service 230. Meanwhile, security may be maintained by keeping the logic of the kernel module 224 in the kernel mode 221. However, in some examples, one or more elements of the new application process watcher 238, and the agent or service 230, may, for added security, be kept in the kernel mode 221 as well.

At block 306, a dedicated agent or service 230 may be notified about the creation event by the kernel module 224, by way of the event filter logic 242, or by the management instrumentation 226, depending on which was used during detection. The event filter logic 242 may receive notifications of events from the kernel module 224, and may select creation events of application processes 218, and filter out termination events of application processes 218 and other non-creation events. This may be done, for example, because the PsSetCreateProcessNotifyRoutine( ) routine may detect both creation events and termination events. Additionally, the agent or service 230 may be instructed to execute the callback 232, for example by the event filter logic 242 or the management instrumentation 226. The agent or service 230 may run as a Windows Service, e.g. a daemon, to execute the callback 232 and to execute an injector 234. In response to the creation event at block 304 or block 306, the callback 232 may be executed by the agent or service 230.

In some examples, the callback 232 may be executed immediately in response to the creation event, while returning to the main code in parallel to guarantee that new creation events are identified by the main code, even if the new creation events are created before the present callback 232 finishes its execution. In other examples, the callback 232 may be executed immediately in response to the creation event, and will return to the main code after the present callback 232 finishes its execution.

At decision block 308, in examples in which the kernel module 224 is used for detection, the process evaluation logic 244 may determine whether the application process 218 is to be suspended prior to injection. This determination may, for example, be based on the minimal time required for the application process 218 to call a system calls that will be intercepted. For example, if the system call is expected to be made prior to injection, then the process evaluation logic 244 may determine that application process 218 is to be suspended and may instruct the suspension logic 246 accordingly. If it is determined that the application process 218 is to be suspended, the method proceeds to block 310, and if it is determined that the application process 218 is not to be suspended, the method proceeds to block 312.

At block 310, in response to the determination, the suspension logic 246 may suspend the application process 218 during the injection. For example, the application process 218 may be suspended prior to injection, and may be resumed once injection is complete. Complex multi-threaded application processes 218 may be suspended by suspending all threads of the application process 218.

At block 312, the callback 232 may instruct the injector 234 to inject a data flow control object 216 into the application process 218 to intercept system calls by the application process 218. In some examples, the data flow control object 216 may be in the form of a library object such as a dynamic-link library (DLL). The injection may occur at an early creation step of the application process 218. In some examples, including some in which the kernel module 224 is used for detection, the injection may occur prior to the process being fully formed or deployed. In other examples, including some in which the management instrumentation 226 is used for detection, the injection may occur after execution of the application process 218. The injection, such as a DLL injection, may be performed using any suitable technique. In some examples, dynamic injection techniques may be used such as CreateRemoteThread of Microsoft Windows, or NTCreateThread. In some examples, static injection techniques may be used. Some injection techniques may be suitable for some types of application processes 218 and other injection techniques may be suitable for other types of application processes 218. Thus, different injection techniques may be used for different types of application processes 218. For example, a series of known injection techniques may be attempted on an application process 218 until injection successfully deploys the data flow control object 216. In some examples, where a particular application process 218 with capabilities for data export is not successfully injected, the agent or service 230 may kill or suspend the application process 218.

At decision block 314, if the application process 218 was suspended, the method proceeds to block 316, and if the application process 218 was not suspended, the method proceeds to block 318. At block 316, the application process 218 may be resumed.

At block 318, the application process 218, now executed, may attempt a system call using system call logic 248, which may include code for implementing any given type of system call. The data flow control object 218 may intercept the system call, and may control the flow of the data handled by the system call.

For example, policy decision logic 250 may utilize the policies discussed earlier, which may be stored in the local policy storage 222, to determine how the system call should be handled. When policies within local policy storage 222 indicate that a system call should be intercepted, detour logic 252 and alternative function logic 256 may take action before making system calls into the operating system 220. Passive or active data control, or both, may be implemented. In some examples, for a trusted user and/or in a secure environment, passive data control policies may be utilized, whereas for a less trusted user or in an insecure environment, passive and/or active data control may be utilized.

In examples in which passive data control is implemented, the detour logic 252 may give a warning to the user that an operation is about to be performed that may compromise sensitive data. The user may be given the chance to confirm if this is an action that is really to be taken. Upon confirmation from the user, the system call requested by application process 218 may be allowed to proceed. In some examples, an action to export data may be allowed, but the export may be monitored by an administrator at run-time, audits may be performed on the exported data, and some or all of the system calls logs and decisions made may be stored within secure logging storage 254 in the computing device 202 or in outside secure storage.

In examples in which active data control is implemented, the detour logic 252 may issue a warning to the user that the action desired to be taken is not allowed, for example if the attempted data export is a potential leak of sensitive data. The alternative function logic 256 may then block or prevent the system call from being executed to prevent data from being exported, and may perform other operations in response to the blocked action. For example, the alternative function logic 256 may offer the user an alternative or modified action and then may assist the user in accomplishing the action. For example, the alternative function logic 256 may force and/or assist the user in encrypting and/or redacting data before the data is sent or stored. In some examples, the user may be authenticated before allow data export. In some examples, the data may be diverted for further action.

The following terminology is understood to mean the following when recited by the specification or the claims. The singular forms 'a,' 'an,' and 'the' are intended to mean 'one or more.' For example, 'a part' includes reference to one or more of such a 'part.' Further, the terms 'including' and 'having' are intended to have the same meaning as the term 'comprising' has in patent law.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

What is claimed is:

1. A non-transitory computer readable storage medium including executable instructions that, when executed by a processor, cause the processor to:
execute a callback that is assigned, using at least one of a kernel module and management instrumentation of an operating system, to a creation event of an application process; and
in response to the execution, inject a data flow control object into the application process prior to the application process having any chance of making system calls to the operating system, the data flow control object to intercept a system call made by the application process and to control flow of data being handled by the system call wherein data is not exported out of the operating system unprocessed by the data flow control object prior to the injection.

2. The non-transitory computer readable storage medium of claim 1 wherein the callback is assigned to the creation event using the kernel module in response to receiving a notification from an application creation process logic of the operating system.

3. The non-transitory computer readable storage medium of claim 1 further comprising executable instructions to suspend the application process during the injection.

4. The non-transitory computer readable storage medium of claim 1 wherein the data flow control object is injected prior to the application process being deployed.

5. The non-transitory computer readable storage medium of claim 1 wherein the callback is assigned to the creation event using the management instrumentation in response to receiving a notification from an application creation process logic of the operating system.

6. The non-transitory computer readable storage medium of claim 1 wherein the data flow control object is to prevent data from being exported by the application process, or to monitor, or to encrypt, or to redact the data in response to the data being exported by the application process.

7. A computer-implemented method comprising:
assigning, using at least one of a kernel module and management instrumentation of an operating system, a callback to a creation event of an application process;
executing the callback in response to the creation event to cause a data flow control object to be injected into the application process prior to the application process having any chance of making system calls to the operating system, the data flow control object to intercept a system call made by the application process and to control flow of data handled by the system call wherein data is not exported out of the operating system unprocessed by the data flow control object prior to the injection.

8. The computer-implemented method of claim 7 wherein the callback is assigned to the creation event using the kernel module in response to receiving a notification from an application creation process logic of the operating system.

9. The computer-implemented method of claim 7 further comprising executable instructions to suspend the application process during the injection.

10. The computer-implemented method of claim 7 wherein the data flow control object is injected prior to the application process being deployed.

11. The computer-implemented method of claim 7 wherein the callback is assigned to the creation event using the management instrumentation in response to receiving a notification from an application creation process logic of the operating system.

12. The computer-implemented method of claim 7 wherein the data flow control object is to prevent data from being exported by the application process, or to monitor, or to encrypt, or to redact the data in response to the data being exported by the application process.

13. A computing device comprising:
hardware resources including,
a processor;
a communication bus; and
a non-transitory computer-readable medium in communication the processor via the communication bus, the medium including instructions that when executed by the processor cause the processor to:
provide an operating system to manage the hardware resources and to provide service for an application process, the operating system having a kernel module or management instrumentation; and
assign, using the kernel module or the management instrumentation, a callback to a creation event of an application process using the kernel module or the management instrumentation prior to the application process having any chance of making system calls to the operating system, the callback to be executed in response to the creation event to cause a data flow control object to be injected into the application process, the data flow control object to intercept a system call made by the application process and to control flow of data handled by the system call, wherein data is not exported out of the operating system unprocessed by the data flow control object prior to the injection.

14. The computing device of claim 13 wherein the data flow control object is to be injected prior to the application process being deployed.

15. The computing device of claim 13 wherein the data flow control object is to prevent data from being exported by the application process, or to monitor, or to encrypt, or to redact the data in response to the data being exported by the application process.

16. The non-transitory computer readable storage medium of claim 1, wherein the kernel module is used for application processes running at or above a threshold speed, and the management instrumentation is used for application processes running below the threshold speed.

17. The computer-implemented method of claim 7 wherein the kernel module is used for application processes running at or above a threshold speed and the management instrumentation is used for application processes running below the threshold speed.

18. The computing device of claim 13 wherein the kernel module is used for application processes running at or above a threshold speed and the management instrumentation is used for application processes running below the threshold speed.

19. The computing device of claim 13 wherein the callback is assigned to the creation event using the kernel module or the management instrumentation in response to receiving a notification from an application creation process logic of the operating system.

20. The non-transitory computer readable storage medium of claim 1 wherein data is not exported out of the operating system prior to authenticating a user of the application process.

* * * * *